United States Patent [19]

Carr

[11] 4,286,168

[45] Aug. 25, 1981

[54] PHANTOM SIMULATION DEVICE FOR SCINTILLATION CAMERAS

[75] Inventor: James R. Carr, Silver Spring, Md.

[73] Assignee: Atomic Products Corp., New York, N.Y.

[21] Appl. No.: 4,337

[22] Filed: Jan. 18, 1979

[51] Int. Cl.² ........................ G21K 3/00; G01D 18/00; G09B 23/28

[52] U.S. Cl. .................................... 250/510; 250/252; 434/218; 434/262

[58] Field of Search ............... 250/510, 252, 312, 320, 250/321; 35/17

[56] References Cited

U.S. PATENT DOCUMENTS 3,348,319 10/1967 Harrison ................................. 35/17

4,055,771 10/1977 Goodenough et al. .......... 250/445 T

OTHER PUBLICATIONS

Atomic Development Corp. Trade Brochure, "Phantoms for Cameras and Scanners", undated.

*Primary Examiner*—Alfred E. Smith
*Assistant Examiner*—Carolyn E. Fields
*Attorney, Agent, or Firm*—Charles E. Temko

[57] ABSTRACT

A phantom simulation imaging quality control device that effectively simulates one centimeter lesions, using steel ball bearings as gamma ray attenuators. The bearings are mounted in a synthetic resinous sheet in an orthogonal pattern. The phantom can provide uniformity, resolution, linearity, distortion and field size checks, all with a single exposure.

3 Claims, 2 Drawing Figures

PHANTOM SIMULATION DEVICE FOR SCINTILLATION CAMERAS

BACKGROUND OF THE INVENTION

This invention relates generally to the field of nuclear medicine, and more particularly to an improved phantom device for use in checking the operation of imaging equipment.

Present trends in quality control procedures for imaging equipment, in recent years, have led further and further away from actual clinical conditions. Known in the prior art are four quadrant, parallel line equal spacing and Hine-Duley bar phantoms which present the camera with straight lines of photon distribution. The orthogonal hole phantom, while an intelligent alternative to the bar patterns, basically presents the camera with another collimator to look into. All of these phantoms present the camera with a very high contrast (lead versus no lead) imaging requirement. Although the lead bars and collimated hole phantoms offer an index of gamma camera capabilities, they fail to adquately simulate the clinical imaging problems presented by a patient. As a practical matter, patients do not present high contrast, straight line, finely collimated tracer distributions.

Although the finely collimated bar and hole pattern of prior art phantoms are useful for evaluation of parallel hole collimators, they are not suitable for use with collimators that have an extreme slant bore.

SUMMARY OF THE INVENTION

Briefly stated, the invention contemplates the provision of a phantom design that uses steel ball bearings as photon attenuators. The bearings are mounted in a sheet of methacrylate material in a pattern of parallel lines in orthogonal directions. Several bearing sizes and varying spacings are suitable. The primary object in the development of the present invention is to enable the performance of a full field flood for uniformity determination simultaneously with resolution, linearity, distortion and size checks. Another object of the invention is to provide a device which will permit the performance of these checks under conditions which more nearly simulate patient characteristics. The use of steel bearings meets this latter object in that they are lower contrast attenuators that present the system with a simulation of spherical "cold" lesions surrounded by scattering medium. There is thus provided a useful quality control device suitable not only for the gamma camera, but also for rectilinear and tomographic scanning systems.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
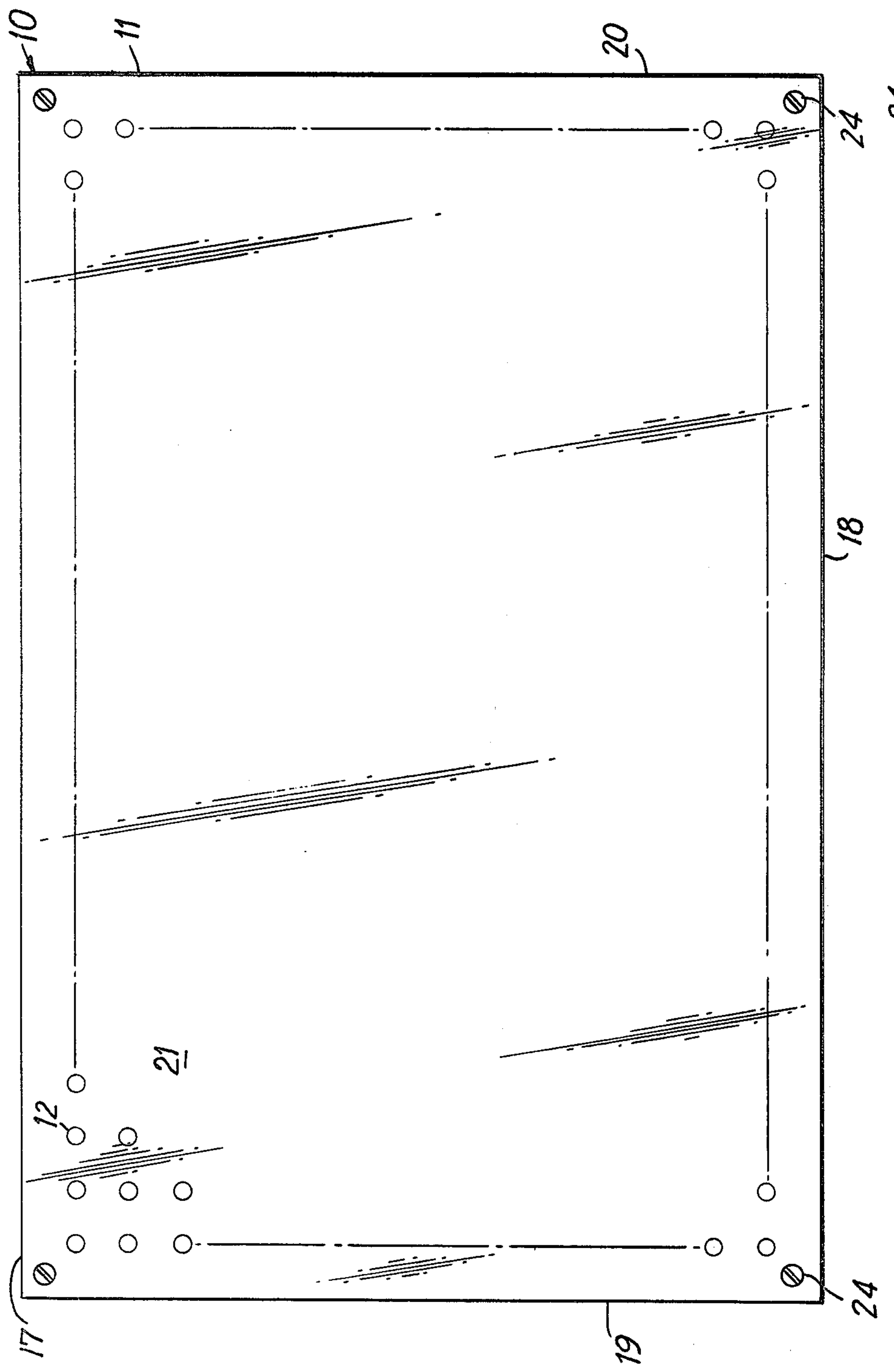
FIG. 1 is a front elevational view of an embodiment of the invention.
Figure 2:
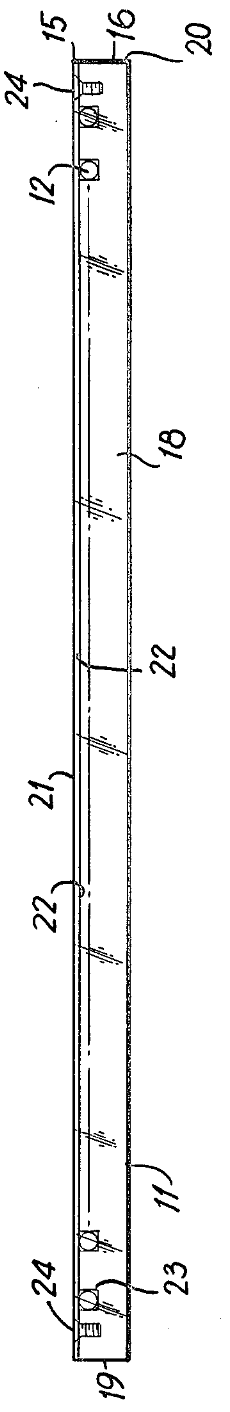
FIG. 2 is a top plan view thereof, as seen from the upper portion of FIG. 1.

In accordance with the invention, the device, generally indicated by reference character 10, comprises broadly a planar base element 11 enclosing a plurality of metallic spheres 12.

The base element 11 includes first and second planar sheets of synthetic resinous material, which is substantially transparent to gamma ray penetration preferably of methacrylate material presently available under the trademark "Plexiglass," and indicated, respectively, by reference characters 15 and 16. Each sheet is bounded by side edges 17 and 18, end edges 19 and 20, an outer surface 21, and an inner or abutting surface 22. One abutting surface 22 in sheet 16 is provided with cylindrical recesses 23, each accommodating an individual steel sphere 12.

As best seen in FIG. 1, the spheres are situated in an orthogonal pattern. The spheres are approximately one centimeter in diameter, and are positioned at intervals of three centimeters.

While I have found it convenient to employ steel ball bearings, which are readily commercially available as spheres 12, it is also possibly to use spheres which are formed from other metallic materials, such as brass, copper, zinc, aluminum, and the like. All of these materials have an attenuating ability which more completely blocks the passage of gamma rays. In mass production, the sheet 16 can be molded to include the recesses 23, and assembled by placing the spheres in the recesses in that sheet, following which the sheet 15 can be laminated using well known solvent type cements, or screws 24.

I wish it to be understood that I do not consider the invention limited to the precise details of structure shown and set forth in this specification, for obvious modifications will occur to those skilled in the art to which the invention pertains.

I claim:

1. A phantom simulation device for gamma ray imaging cameras comprising: a generally planar base element which is substantially transparent to gamma ray penetration, and a plurality of metallic spheres supported by said base element in predetermined pattern; said base element including a pair of juxtaposed synthetic resinous sheets, said spheres being mounted within bores in the plane of one of said sheets.

2. A phantom simulation device in accordance with claim 1, in which said spheres are in the form of steel ball bearings of diameter approximating one centimeter.

3. A phantom simulation device in accordance with claim 1, in which said spheres are arranged in an orthogonal pattern at intervals of approximately 3 centimeters.

* * * * *